(12) United States Patent
Kara et al.

(10) Patent No.: US 9,209,614 B2
(45) Date of Patent: Dec. 8, 2015

(54) LINE BRACKET FOR MOUNTING ON A SUPPORT STRUCTURE OF AN AIRPLANE

(75) Inventors: Ali Kara, Prisdorf (DE); Konstantin Zitzer, Hamburg (DE); Maria Ioan, Hamburg (DE)

(73) Assignee: Airbus Operations GmbH (DE)

( * ) Notice: Subject to any disclaimer, the term of this patent is extended or adjusted under 35 U.S.C. 154(b) by 168 days.

(21) Appl. No.: 13/531,911

(22) Filed: Jun. 25, 2012

(65) Prior Publication Data

US 2013/0001372 A1 Jan. 3, 2013

Related U.S. Application Data

(60) Provisional application No. 61/503,006, filed on Jun. 30, 2011.

(30) Foreign Application Priority Data

Jun. 30, 2011 (DE) .......................... 10 2011 107 610

(51) Int. Cl.
*F16L 3/08* (2006.01)
*H02G 3/32* (2006.01)
*F16L 3/10* (2006.01)
*F16L 3/223* (2006.01)
*F16L 3/127* (2006.01)

(52) U.S. Cl.
CPC ................ *H02G 3/32* (2013.01); *F16L 3/1025* (2013.01); *F16L 3/1075* (2013.01); *F16L 3/127* (2013.01); *F16L 3/2235* (2013.01)

(58) Field of Classification Search
CPC ..... F16L 3/1075; F16L 3/2235; F16L 3/1025; F16L 3/127; F16L 3/04; H02G 3/32; B60R 16/0215
USPC .............. 248/65, 68.1, 62, 70, 73, 74.1, 74.2; 174/135, 480; 439/451
See application file for complete search history.

(56) References Cited

U.S. PATENT DOCUMENTS 4,783,029 A * 11/1988 Geppert et al. .............. 248/74.1
5,535,969 A * 7/1996 Duffy, Jr. ..................... 248/68.1
(Continued)

FOREIGN PATENT DOCUMENTS

DE 19752525 C1 8/1998
DE 10212484 A1 10/2003
(Continued)

*Primary Examiner* — Todd M Epps
(74) *Attorney, Agent, or Firm* — Lerner, David, Littenberg, Krumholz & Mentlik, LLP

(57) ABSTRACT

A line bracket for mounting on a support structure of an airplane, includes a mounting section for attachment to the support structure and a U-shaped bracket section for receiving at least one line. The support structure can be closed by a cover part (by a clip-on connection, wherein the mounting section is configured to be plate-like for resting against the support structure, a floor region of the U-shaped bracket section extends essentially at a right angle away from the mounting section, and a first leg region of the bracket section is formed by part of the mounting section and corresponds to an opposite second leg region for forming an insertion opening for the line, which insertion opening) is closeable by way of the cover part that is hinged at the end of one of the leg regions, to install the line from the side in the bracket section.

9 Claims, 3 Drawing Sheets

(56) References Cited

U.S. PATENT DOCUMENTS

| | | | |
|---|---|---|---|
| 6,206,331 B1 * | 3/2001 | Keith et al. | 248/74.1 |
| 7,304,861 B2 * | 12/2007 | Takahashi | 361/760 |
| 8,157,222 B1 * | 4/2012 | Shirey et al. | 248/74.1 |
| 8,286,923 B2 * | 10/2012 | Kobayashi et al. | 248/74.2 |
| 8,317,526 B2 * | 11/2012 | Gardner et al. | 439/100 |

| | | |
|---|---|---|
| 2005/0269462 A1 | 12/2005 | Hauser |

FOREIGN PATENT DOCUMENTS

| | | |
|---|---|---|
| DE | 202006011381 U1 | 10/2006 |
| DE | 102008023241 A1 | 11/2009 |
| DE | 102008041230 A1 | 2/2010 |

* cited by examiner

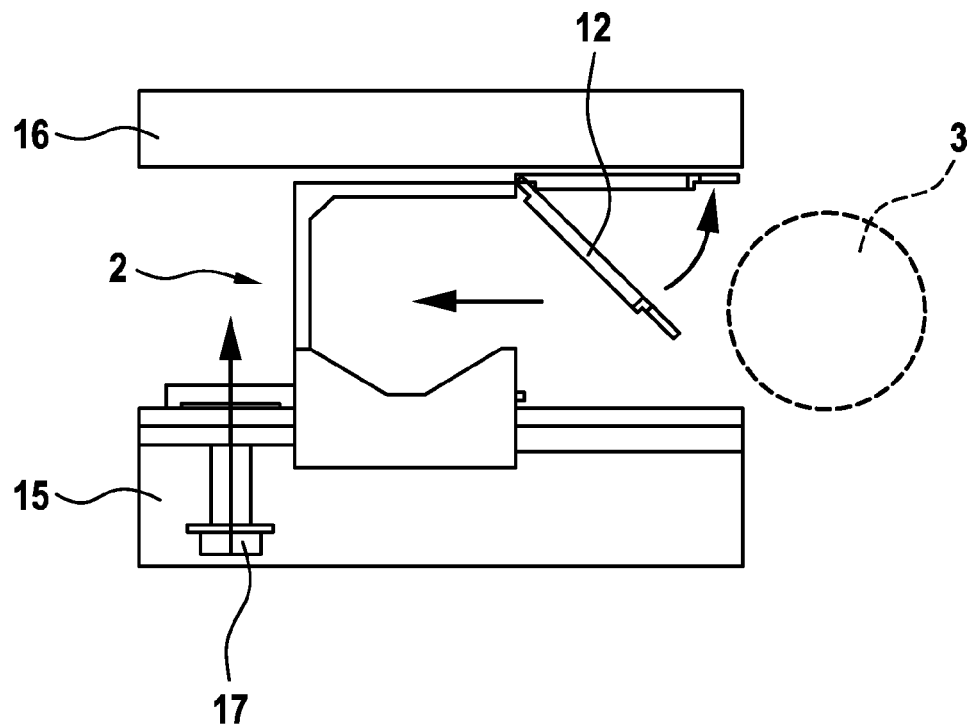
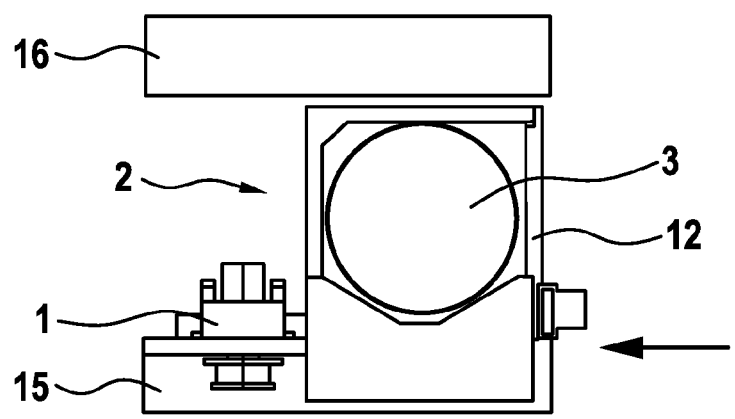

LINE BRACKET FOR MOUNTING ON A SUPPORT STRUCTURE OF AN AIRPLANE

CROSS-REFERENCE TO RELATED APPLICATIONS

The present application claims the benefit of the filing date of U.S. Provisional Patent Application No. 61/503,006 filed Jun. 30, 2011, the disclosure of which is hereby incorporated herein by reference.

AREA OF THE INVENTION

The invention relates to a line bracket for mounting on a support structure of an airplane, with a mounting section for attachment to the support structure and a U-shaped bracket section for receiving at least one line, which support structure can be closed by way of a cover part via a clip-on connection.

The field of use of the invention predominantly relates to airplane engineering. In the interior of an aircraft fuselage there are usually a host of electrical and fluidic lines that extend on the aircraft structure, which usually comprises stringers and frame elements, or underneath the floor of an aircraft deck, and are thus attached to support structures or the like by way of line brackets. While a mounting section of a line bracket is attached to the structure of an airplane, a bracket section is used to receive said lines or a line bundle. A line bracket is predominantly used for mounting and routing of the lines, while at the same time serving a protective function against damage.

DE 10 2008 041 230 A1 describes a line bracket for mounting at least one line, in particular an electrical line, to a fuselage cell structure of an airplane. The line bracket makes it possible to achieve torsion-free mounting of the line. Moreover, complete mechanical decoupling between the line bracket and any expansion movements of the fuselage cell structure is achieved. Torsion-free installation of the line is achieved in each case by two leg-like toothed racks that are arranged parallel so as to be spaced apart from each other, onto which toothed racks a cross web can be slid so that it snaps into place. A mounting section is used for installing the line bracket to the fuselage cell structure. Since this line bracket is of an elongated design and the line can be inserted into the bracket section only from the top, said line bracket is not suitable for all the installation space situations within an airplane. There are installation space situations in which above the line bracket a further support structure of the airplane or a cover extends so that placing the cable into the bracket section is rendered difficult. In extreme cases it is necessary to first deinstall interfering components before any lines can be inserted in such a line bracket.

From DE 197 52 525 C1 another line bracket is known, whose mounting section laterally joins a bracket section for receiving two lines. Consequently, this line bracket can be affixed to a support structure so that said line bracket protrudes laterally in order to adapt to confined installation space situations. However, here again, inserting the lines into the bracket sections takes place from the top, and moreover the cover parts, which are installed on the bracket sections by way of a clip-on connection, require an additional pivot area for opening and closing.

An embodiment of the present invention includes a line bracket for mounting on a support structure of an airplane, which line bracket is suitable for confined installation space situations of the line bracket, and furthermore distinguishes itself by its simple design and quick installation of a line to be affixed by it.

BACKGROUND OF THE INVENTION

The invention includes a technical teaching according to which the mounting section of the line bracket is designed so as to be plate-like for resting against the support structure, wherein a floor region of the U-shaped bracket section extends essentially at a right angle away from the mounting section, and a first leg region of the bracket section is formed by part of the mounting section and corresponds to an opposite second leg region for forming an insertion opening for the line, which insertion opening is closeable by way of the cover part hinged at the end of one of the leg regions, in order to install the line from the side in the bracket section.

The advantage of the solution according to an embodiment of the invention is, in particular, due to the line bracket being able to be installed flat against a support structure, and insertion of the line being able to take place from the side. Thus even narrow gap regions of support structures that are situated on top of each other, or small spaces between support structures and lining panels or floor panels can be used in order to install lines in this space along the aircraft structure. In particular, there is no need to deinstall already preinstalled lining panels or floor panels.

According to a preferred embodiment of the invention, the cover part should be hinged at the end of the second leg region. This results in particularly comfortable installation, for which the cover part is to be hinged open in order to insert the line into the bracket section by way of the insertion opening. Subsequently, the cover part can be closed by hinging down the clip-on connection.

The line bracket according to an embodiment of the invention with the mounting section and bracket section comprises a plastic material that can efficiently be shaped by injection molding. For this purpose, in particular, a polyamide material, preferably PA66, is used. With the use of a plastic material for injection molding the line bracket according to the invention, the cover part can in a simple manner be hinged to the first or second leg region by way of a film hinge so that even the hinge of the cover part can be manufactured with the use of injection-molding technology. As an alternative to this it is also possible to provide a conventional hinge at this position in order to captively connect the cover part to the line bracket.

According to a further measure of the invention, it is proposed that the first leg region on the inside of the bracket section form a V-shaped supporting surface that is beveled on both sides for guiding the line. Since in most instances the line or the cable bundle comprises a circular cross section, by means of the V-shaped supporting surface in the interior of the bracket section exact guidance for the alignment of the line can be predetermined. Instead or in addition to the aforesaid it is also possible, at the mounting section of the line bracket in the direction of alignment of the line, to provide V-shaped supporting surfaces for the line, preferably at the two opposite edges of the plate-like mounting section, which mounting section comes to rest against the support structure.

Mounting the line bracket above the mounting section at the support structure preferably takes place by way of at least one separate mounting means, for example at least one screw, which in each case extends through a corresponding through-hole in the mounting section and a corresponding through-hole in the support structure. Preferably, the mounting section comprises a mounting tab formed in the plate plane, which mounting tab in fact comprises these through-holes.

In order to create a space-saving arrangement, the mounting tab formed on the plate-like mounting section should extend away towards the outside when viewed from the floor region of the bracket section, in other words in the opposite direction of the insertion opening of the floor region of the bracket section, so that the mounting means inserted into the through-holes cannot impede the insertion of the line into the bracket section of the line bracket.

According to another measure of invention, it is proposed that on one side of the plate-like mounting section a hook-shaped limit stop be provided for right-angled positioning of the line extension direction determined by way of the bracket section relative to the support structure. By means of the limit stop, the line bracket can be precisely placed to the support structure. If pre-made holes are already provided in the support structure for the purpose of installing the line bracket, because of the limit stop precisely flush agreement of the holes during installation can be achieved, which simplifies installation. The hook-shaped limit stop can in a simple manner be formed directly on the mounting section of the line holder. Thanks to the hook-shaped limit stop the limit stop can reach around the edge region of the support structure in order to make it possible to clip the line bracket to the support structure to facilitate installation.

BRIEF DESCRIPTION OF THE DRAWINGS

Further measures of the invention are shown below, together with the description of a preferred exemplary embodiment of the invention, with reference to the figures.

DETAILED DESCRIPTION

Figure 1:
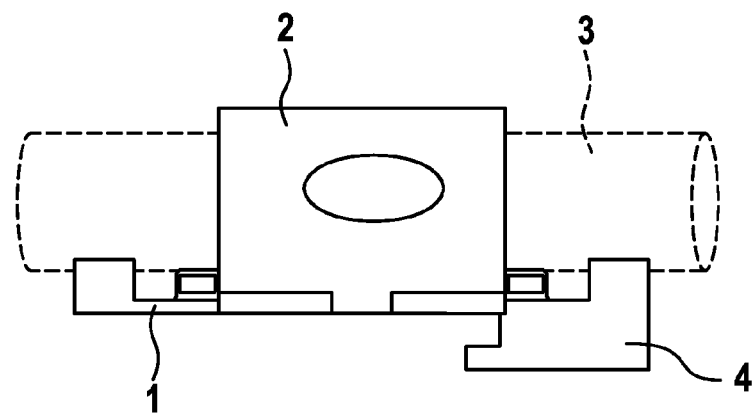
FIG. 1—a top view of a line bracket,
FIG. 2—a front view of the line bracket according to FIG. 1,
FIG. 3—a lateral view of the line bracket according to FIG. 1 with an indicated inserted line, and
FIGS. 4a to 4c—a sequence of images for illustrating the installation order of the line bracket.

According to FIG. 1 the line bracket comprises a plate-like mounting section 1 for resting on a support structure (not shown in detail) as well as a bracket section 2, connected in a single piece with the mounting section 1 for receiving at least one line 3 (only shown diagrammatically.) On one side of the plate-like mounting section 1 a hook-shaped limit stop 4 is formed that is provided for right-angled positioning of the line extension direction, determined by way of the bracket section 2, relative to the support structure.

Figure 2:
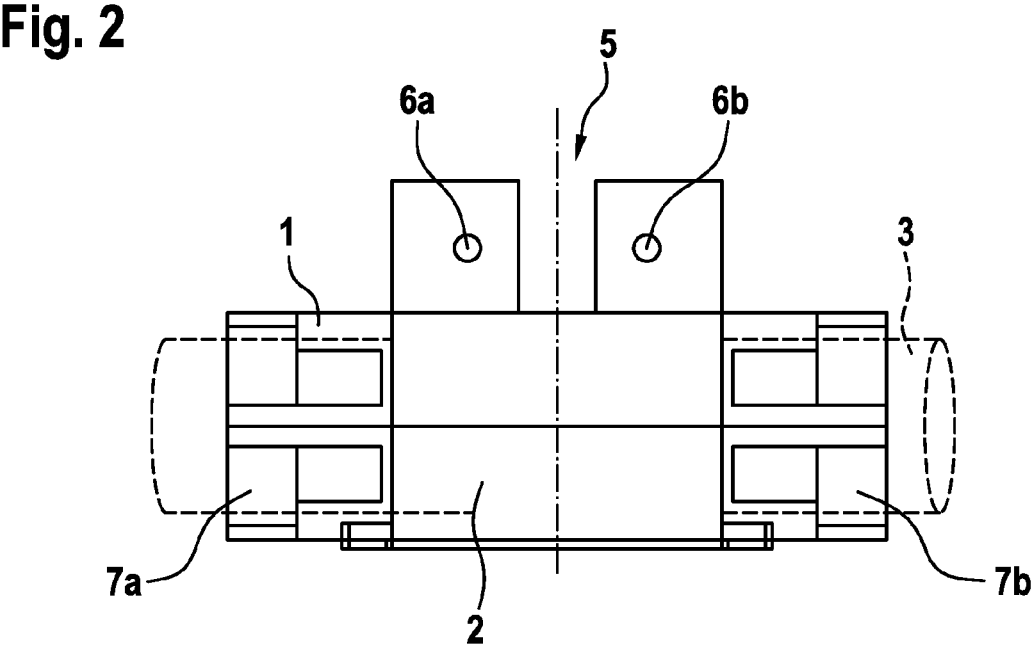

According to FIG. 2, in the plate plane of the mounting section 1 of the line bracket a mounting tab 5 is formed that comprises two through-holes 6a and 6b for screwing the line bracket to the support structure. Above the limit stop (not shown in FIG. 2), on the opposite ends of the plate-like mounting section 2, in each case a V-shaped supporting surface 7a and 7b that is beveled on both sides is formed, which supporting surface 7a and 7b is used to support and guide the line 3.

Figure 3:
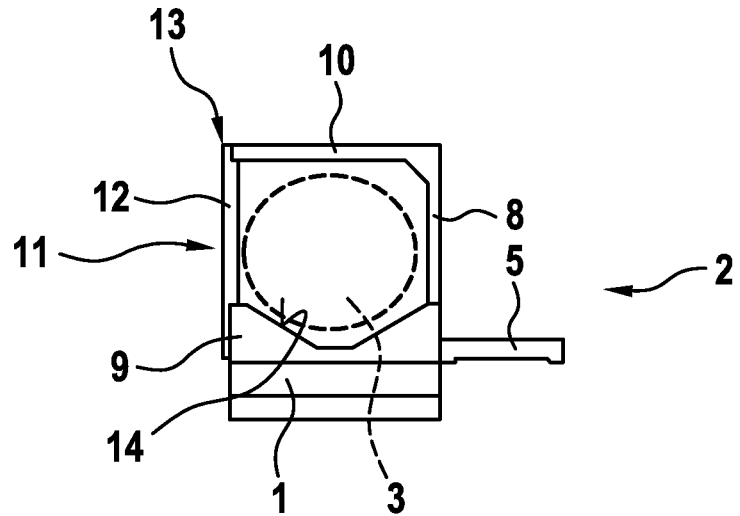

According to FIG. 3 the bracket section 2 is U-shaped and comprises a floor region 8 that extends at a right angle away from the mounting section 1. A first leg region 9 of the bracket section 2 is formed by part of the mounting section 1 and corresponds to an opposite second leg region 10 to form the U-shaped bracket section 2 which comprises an insertion opening 11 for the line 3. At the end of the second leg region 10 a cover part 12 is hinged by way of a film hinge 13, by means of which cover part 12 the insertion opening 11 can be closed in order to install the line 3 from the side in the bracket section 2. On the first leg region 9 of the bracket section 2 a V-shaped supporting surface 14 is formed that is beveled on both sides to guide the line 3.

Figure 4A:
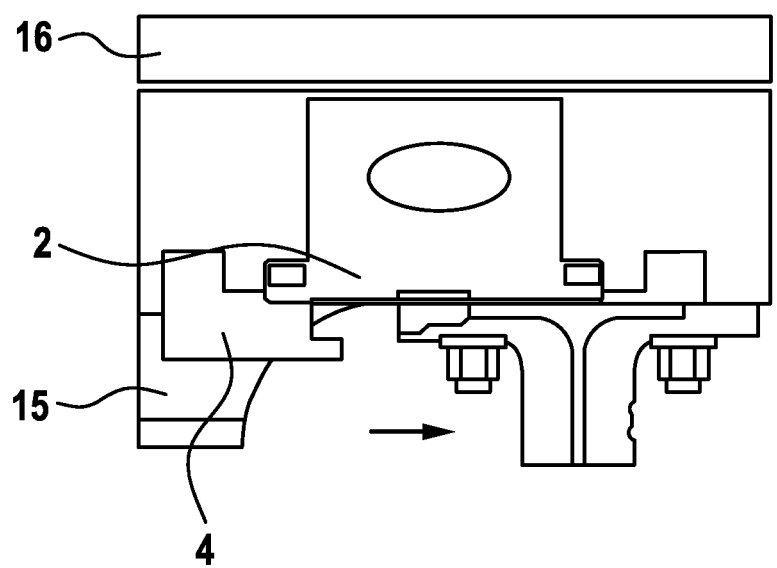

Installation takes place according to FIG. 4a in that the line bracket with the mounting section 1 is first clipped onto the support structure 15 of the structure of the airplane. Above the support structure 15 an installation-space-limiting further support structure 16 extends so that the line bracket is positioned between the support structure 15 and the support structure 16. The hook-shaped limit stop 4 on the end determines the nominal position of the clipped-on line bracket on the support structure 15.

Subsequently, according to FIG. 4b, above the mounting section 2 the line bracket is screwed onto the support structure 15 with the use of a separate mounting means 17 designed as a screw, and the cover part 12 of the bracket section 2 is opened to insert the line 3.

According to FIG. 4c, after the line 3 has been inserted, the cover part 12 is closed by way of a clip connection so that the line 3 is mounted from the side in the bracket section 2 of the line bracket and is securely positioned relative to the support structure 15.

LIST OF REFERENCE CHARACTERS

1 Mounting section
2 Bracket section
3 Line
4 Limit stop
5 Mounting tab
6 Through-hole
7 Supporting surfaces
8 Floor region
9 First leg region
10 Second leg region
11 Insertion opening
12 Cover part
13 Film hinge
14 Supporting surface
15 Support structure
16 Support structure
17 Mounting means

The invention claimed is:
1. A line bracket for mounting on a support structure of an airplane, the line bracket comprising:
    a mounting section for attachment to the support structure;
    a U-shaped bracket section for receiving at least one line;
    a cover part, wherein the U-shaped bracket section is configured to be closed by the cover part by a clip-on connection,
    wherein the mounting section comprises a flat surface for resting against the support structure,
    wherein a floor region of the U-shaped bracket section extends essentially at a right angle away from the mounting section,
    wherein a first leg region of the bracket section is formed by part of the mounting section and corresponds to an opposite second leg region for forming an insertion opening for the line, which insertion opening is closeable by way of the cover part hinged at an end of one of the first and second leg regions, to install the line from a side of the bracket section,
    wherein the first leg region inside of the bracket section includes a pre-determined V-shaped supporting surface beveled on both sides for guiding the line, the pre-determined V-shape of the supporting surface of the first leg region inside of the bracket section being formed prior to reception of the line.

2. The line bracket of claim 1, wherein the cover part is hinged at the end of the second leg region.

3. The line bracket of claim 1, wherein the cover part is hinged to the first or second leg region by a film hinge.

4. The line bracket of claim 1, wherein the mounting section with the bracket section comprises a plastic material manufactured by injection molding.

5. The line bracket of claim 1, further comprising at least one mounting means for affixing the mounting section to the support structure.

6. The line bracket of claim 5, wherein the at least one mounting means comprises a screw extending through a corresponding through-hole through a mounting tab formed in a plate plane on the mounting section.

7. The line bracket of claim 6, wherein the mounting tab formed on the mounting section extends from the floor region of the bracket section in a direction opposite the insertion opening.

8. The line bracket of claim 1, further comprising, on one side of the mounting section, a hook-shaped limit stop for right-angled positioning of a line extension direction determined by the bracket section relative to the support structure.

9. The line bracket of claim 8, wherein the V-shaped supporting surface is above the limit stop and on the opposite end of the mounting section.

\* \* \* \* \*